US010415558B2

(12) United States Patent
DeCataldo et al.

(10) Patent No.: US 10,415,558 B2
(45) Date of Patent: Sep. 17, 2019

(54) DISCHARGE CONDUIT CONNECTION FOR A COMPRESSOR

(71) Applicant: Haier US Appliance Solutions, Inc., Wilmington, DE (US)

(72) Inventors: Charles Anthony DeCataldo, Louisville, KY (US); Gregory William Hahn, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 174 days.

(21) Appl. No.: 15/598,388

(22) Filed: May 18, 2017

(65) Prior Publication Data

US 2018/0335027 A1 Nov. 22, 2018

(51) Int. Cl.
| | |
|---|---|
| *F04B 39/12* | (2006.01) |
| *F04B 39/10* | (2006.01) |
| *F25B 1/02* | (2006.01) |
| *F16L 37/092* | (2006.01) |
| *F04B 35/04* | (2006.01) |
| *F04B 39/00* | (2006.01) |

(52) U.S. Cl.
CPC ............ *F04B 39/123* (2013.01); *F04B 39/10* (2013.01); *F04B 39/121* (2013.01); *F16L 37/0925* (2013.01); *F25B 1/02* (2013.01); *F04B 35/04* (2013.01); *F04B 39/0005* (2013.01); *F25B 2309/001* (2013.01)

(58) Field of Classification Search
CPC ....... F04B 39/10; F04B 39/121; F04B 39/123
See application file for complete search history.

(56) References Cited

U.S. PATENT DOCUMENTS

| | | | | |
|---|---|---|---|---|
| 4,648,811 | A * | 3/1987 | Tahata | F04B 39/123 219/117.1 |
| 5,059,100 | A | 10/1991 | Quesada et al. | |
| 6,537,041 | B2 | 3/2003 | Lee | |
| 7,585,161 | B2 | 9/2009 | Noh et al. | |
| 8,678,789 | B2 | 3/2014 | Orum et al. | |
| 2011/0243773 | A1 * | 10/2011 | Brostrom | F04B 39/121 417/572 |
| 2015/0219086 | A1 | 8/2015 | Puff et al. | |
| 2016/0131125 | A1 | 5/2016 | Yang et al. | |
| 2018/0298889 | A1 * | 10/2018 | Chang | F04B 33/00 |

\* cited by examiner

*Primary Examiner* — P. Macade Nichols
(74) *Attorney, Agent, or Firm* — Dority & Manning, P.A.

(57) ABSTRACT

A compressor includes a discharge conduit that extends between a discharge valve and a hermetic shell within the hermetic shell. A sealing connection assembly includes a housing mounted to one of the discharge valve and the hermetic shell. An inner surface of the housing has a tapered portion that contracts to a sealing edge. An end portion of the discharge conduit is positioned within the passage of the housing such that an outer surface of the discharge conduit is positioned on and contacts the inner surface of the housing at the sealing edge.

20 Claims, 7 Drawing Sheets

DISCHARGE CONDUIT CONNECTION FOR A COMPRESSOR

FIELD OF THE INVENTION

The present subject matter relates generally to compressors and discharge conduits for compressors.

BACKGROUND OF THE INVENTION

Refrigerator appliances generally include a compressor. During operation of the refrigerator appliance, the compressor operates to provide compressed refrigerant. The refrigerator appliance utilizes such compressed refrigerant to cool a compartment of the appliance and food items located therein. Recently, linear compressors have been used to compress refrigerant in refrigerator appliances. Linear compressors can include a piston and a driving coil. The driving coil receives a current in order to generate a force that slides the piston backward and forwards within a chamber to compress refrigerant.

Appliance compressors are frequently enclosed within a hermetic shell that the refrigerant flows through during operation of the compressors. The hermetic shell contains the refrigerant but proving a reliable seal around a refrigerant conduit that extends through the hermetic shell can be difficult. Certain compressors include a metal refrigerant conduit that extends between a discharge valve and the hermetic shell. To seal the connection between the metal refrigerant conduit and the hermetic shell, the metal refrigerant conduit is brazed to the hermetic shell. However, reliably brazing the metal refrigerant conduit to the hermetic shell is a labor intensive and expensive process.

Accordingly, a compressor with features for reliably sealing an interface between a refrigerant conduit and a hermetic shell would be useful.

BRIEF DESCRIPTION OF THE INVENTION

The present subject matter provides a compressor with a discharge conduit that extends between a discharge valve and a hermetic shell within the hermetic shell. A sealing connection assembly includes a housing mounted to one of the discharge valve and the hermetic shell. An inner surface of the housing has a tapered portion that contracts to a sealing edge. An end portion of the discharge conduit is positioned within the passage of the housing such that an outer surface of the discharge conduit is positioned on and contacts the inner surface of the housing at the sealing edge. Additional aspects and advantages of the invention will be set forth in part in the following description, or may be apparent from the description, or may be learned through practice of the invention.

In a first example embodiment, a compressor includes a hermetic shell. A discharge valve is positioned within the hermetic shell. A discharge conduit extends between the discharge valve and the hermetic shell within the hermetic shell. A sealing connection assembly includes a housing mounted to one of the discharge valve and the hermetic shell. An inner surface of the housing defines a passage that extends through the housing. The inner surface of the housing has a tapered portion that contracts to a sealing edge. An end portion of the discharge conduit is positioned within the passage of the housing such that an outer surface of the discharge conduit is positioned on and contacts the inner surface of the housing at the sealing edge. The sealing edge and the outer surface of the discharge conduit form a seal where the outer surface of the discharge conduit is positioned on and contacts the sealing edge.

In a second example embodiment, a compressor includes a hermetic shell. A discharge valve is positioned within the hermetic shell. A discharge conduit extends between the discharge valve and the hermetic shell within the hermetic shell. A sealing connection assembly includes a housing mounted to one of the discharge valve and the hermetic shell. An inner surface of the housing defines a passage that extends through the housing. The inner surface of the housing has a tapered portion that contracts to a sealing edge. An end portion of the discharge conduit is positioned within the passage of the housing such that an outer surface of the discharge conduit is positioned on and contacts the inner surface of the housing at the sealing edge. The sealing edge and the outer surface of the discharge conduit form a seal where the outer surface of the discharge conduit is positioned on and contacts the sealing edge. A clamp has a tubular body that is positioned within the housing and is received on the discharge conduit. A clip of the clamp extends from the tubular body into the passage of the housing. A plurality of tabs is positioned on the tubular body at an end of the tubular body. The plurality of tabs is positioned on and contacts the discharge conduit at the tapered portion of the inner surface of the housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
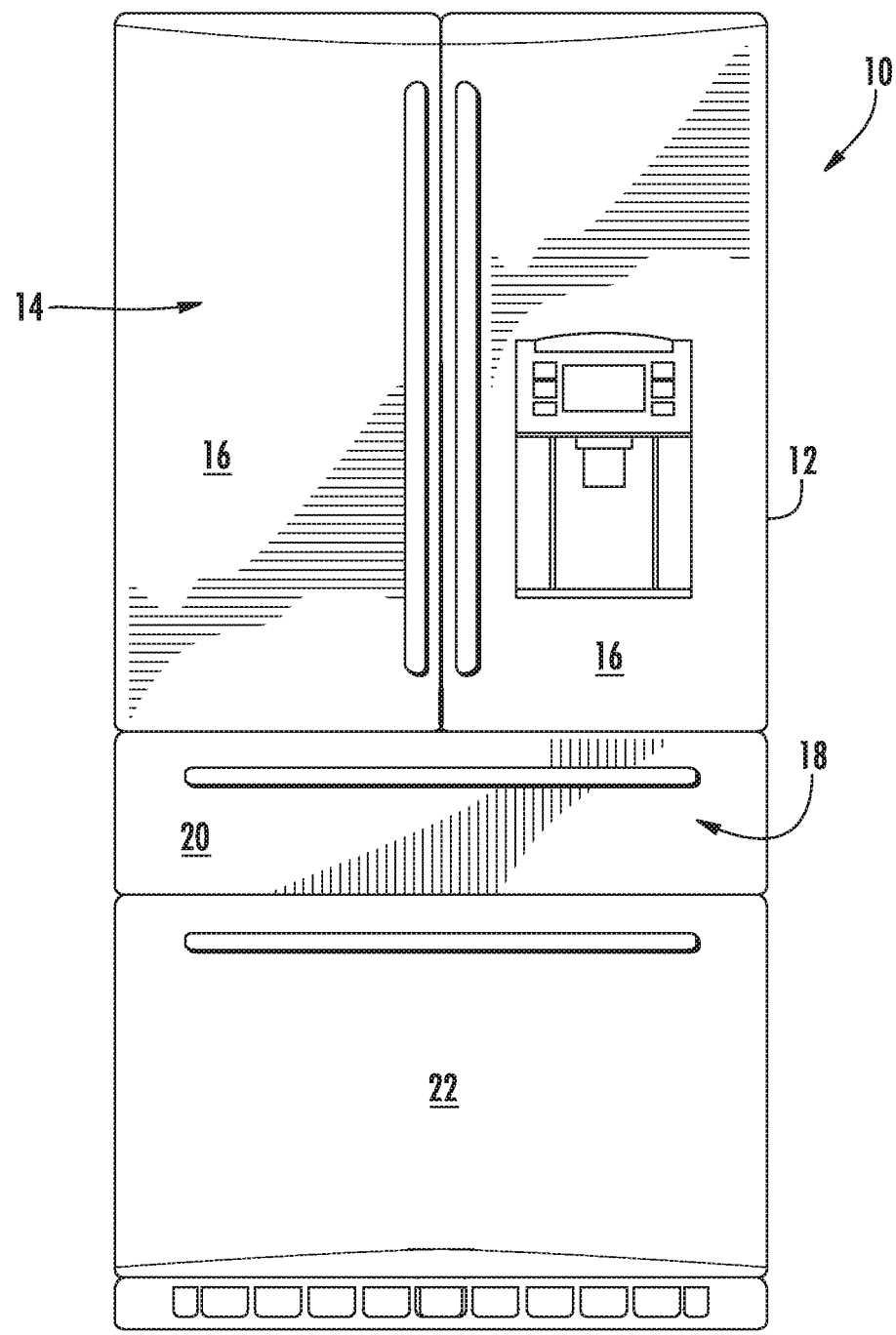
FIG. 1 is a front view of a refrigerator appliance according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

Figure 2:
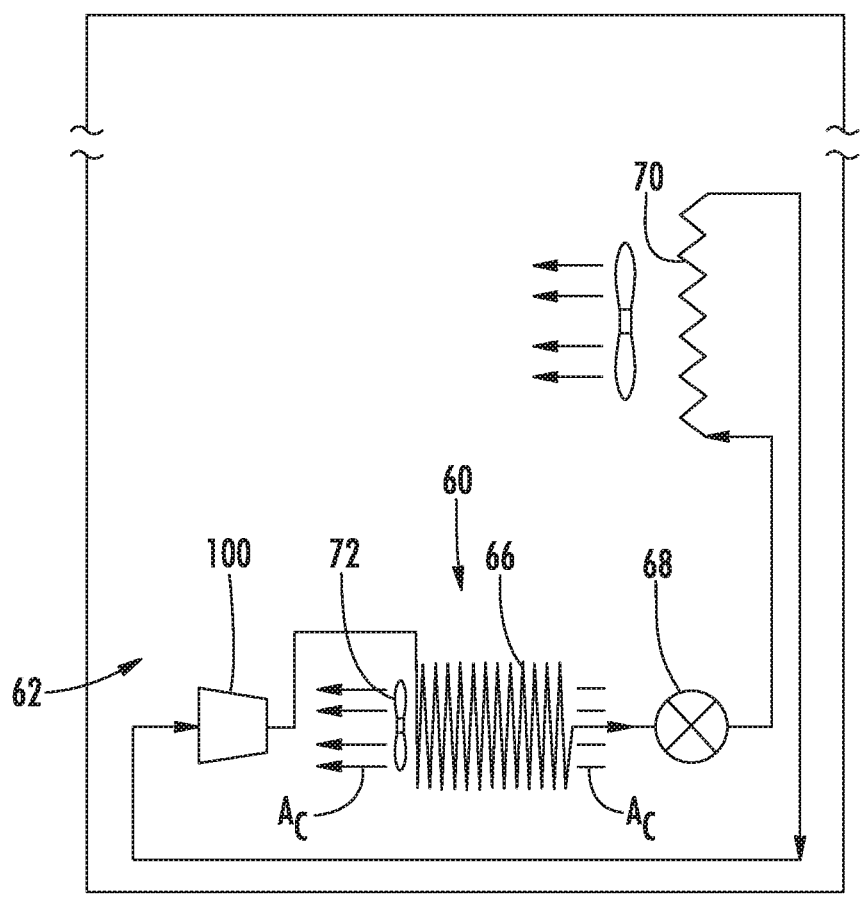
FIG. 2 is schematic view of a refrigeration system of the example refrigerator appliance of FIG. 1.

FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In addition, it should be understood that the present subject matter is not limited to use in appliances. Thus, the present subject matter may be used for any other suitable purpose such as vapor compression within air conditioners or heat pumps.

In the illustrated example embodiment shown in FIG. 1, the refrigerator appliance 10 is depicted as an upright refrigerator having a cabinet or casing 12 that defines a number of internal storage compartments. In particular, refrigerator appliance 10 includes upper fresh-food compartments 14 having doors 16 and lower freezer compartment 18 having upper drawer 20 and lower drawer 22. The drawers 20, 22 may be "pull-out" drawers in that they can be manually moved into and out of the freezer compartment 18 on suitable slide mechanisms.

FIG. 2 is a schematic view of refrigerator appliance 10 including an example sealed refrigeration system 60. A machinery compartment 62 contains components for executing a known vapor compression cycle for cooling air within refrigerator appliance 10. The components include a linear compressor 100, a condenser 66, an expansion device 68, and an evaporator 70 connected in series and charged with a refrigerant. Linear compressor 100 is discussed in greater detail below. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, gaseous refrigerant flows into linear compressor 100, which operates to increase the pressure of the refrigerant. This compression of the refrigerant raises its temperature, which is lowered by passing the gaseous refrigerant through condenser 66. Within condenser 66, heat exchange with ambient air takes place so as to cool the refrigerant and cause the refrigerant to condense to a liquid state. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device (e.g., a valve, capillary tube, or other restriction device) 68 receives liquid refrigerant from condenser 66. From expansion device 68, the liquid refrigerant enters evaporator 70. Upon exiting expansion device 68 and entering evaporator 70, the liquid refrigerant drops in pressure and temperature. Due to the pressure drop and phase change of the refrigerant, evaporator 70 is cool relative to compartments 14, 18 of refrigerator appliance 10. As such, cooled air is produced and refrigerates compartments 14, 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through refrigeration compartments 14, 18 (FIG. 1). The refrigeration system 60 depicted in FIG. 2 is provided by way of example only. Thus, it is within the scope of the present subject matter for other configurations of the refrigeration system to be used as well.

Figure 3:
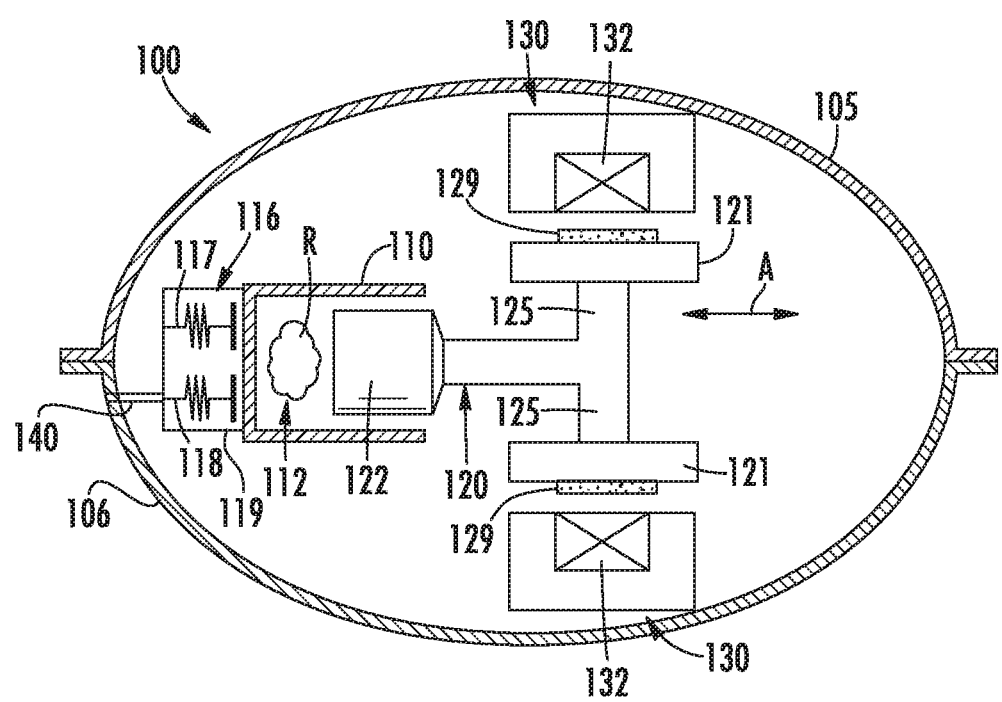
FIG. 3 is a schematic view of a linear compressor according to an example embodiment of the present subject matter.

FIG. 3 is a schematic view of linear compressor 100 according to an example embodiment of the present subject matter. As may be seen in FIG. 3, linear compressor 100 is enclosed in a hermetic or air-tight shell 105. Hermetic shell 105 can, e.g., hinder or prevent refrigerant from leaking or escaping from refrigeration system 60 (FIG. 2) at linear compressor 100.

Linear compressor 100 includes a casing 110 and also defines an axial direction A. Casing 110 defines a chamber 112 that extends longitudinally along the axial direction A. Casing 110 further includes valves 116 that permit refrigerant (shown as R) to enter and exit chamber 112 during compression of refrigerant R by linear compressor 100.

A piston assembly 120 with a piston head 122 is slidably received within chamber 112 of casing 110. In particular, piston head 122 is slidable along the axial direction within chamber 112. During sliding of piston head 122 within chamber 112, piston head 122 compresses refrigerant R within chamber 112. Piston head 122 can slide between a default position, a top dead center position, and a bottom dead center position within chamber 112 as will be understood by those skilled in the art.

As an example, from the top dead center position, piston head 122 can slide within chamber 112 towards the bottom dead center position along the axial direction, i.e., an expansion stroke of piston head 122. During the expansion stroke of piston head 122, an intake/suction valve 117 of valves 116 permits refrigerant R to enter chamber 112 through intake/suction valve 117. When piston head 122 reaches the bottom dead center position, piston head 122 changes direction and slides in chamber 112 back towards the top dead center position, i.e., a compression stroke of piston head 122. During the compression stroke of piston head 122, refrigerant R that enters chamber 112 during the expansion stroke is compressed until refrigerant R reaches a particular pressure and such compressed refrigerant R at a higher pressure and temperature exits chamber 112 through a discharge valve 118 of valves 116. In such a manner, refrigerant R is compressed within chamber 112 by piston head 122.

Piston assembly 120 also includes a flange 121. Flange 121 is radially spaced apart from a shaft 126 and may also extend circumferentially about shaft 126, as will be understood by those skilled in the art. Brackets 125 extend between and connect flange 121 and shaft 126. At least one driving magnet 129, e.g., one, two, three, or more driving magnets, is mounted to flange 121. Driving magnet 129 may extend circumferentially about shaft 126 on flanges 121.

Linear compressor 100 further includes a motor 130 with at least one driving coil 132. Driving coil 132 is positioned proximate flange 121 of piston assembly 120. Driving coil 132 is configured for selectively urging piston head 122 to slide along the axial direction A within chamber 112. In particular, driving coil 132 receives a current from a current source (not shown) in order to generate a magnetic field that engages driving magnet 129 and urges piston assembly 120 to move along the axial direction A in order to compress refrigerant R within chamber 112, as will be understood by those skilled in the art. In particular, driving coil 132 can slide piston assembly 120 between the top dead center position and the bottom dead center position.

During operation of linear compressor 100, piston assembly 120 reciprocates to compress refrigerant R, and the compressed refrigerant R flows out of chamber 112 through discharge valve 118. From discharge valve 118, the compressed refrigerant R is directed into a discharge conduit 140. Discharge conduit 140 extends between discharge valve 118 and hermetic shell 105 such that the compressed refrigerant R is flowable through discharge conduit 140 from discharge valve 118 to hermetic shell 105. As a particular example, discharge conduit 140 may be mounted to and extend between a wall 119 of discharge valve 118 and a wall 106 of hermetic shell 105. As discussed in greater detail below, linear compressor 100 may include features for reliably sealing a connection between discharge valve 118 and discharge conduit 140 and/or a connection between hermetic shell 105 and discharge conduit 140.

Figure 4:
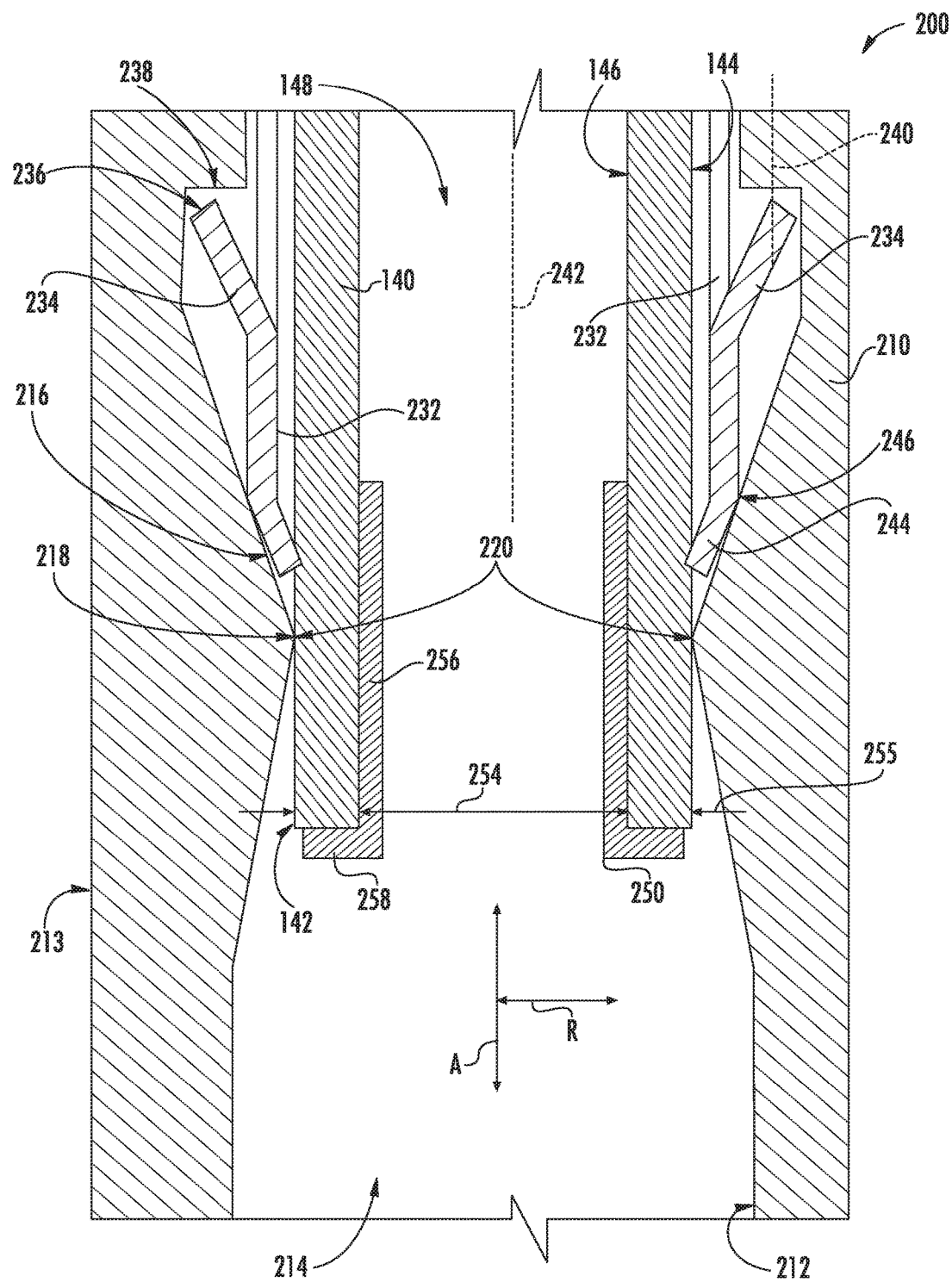
FIG. 4 is a partial, section view of a sealing connection assembly according to an example embodiment of the present subject matter.
Figure 5:
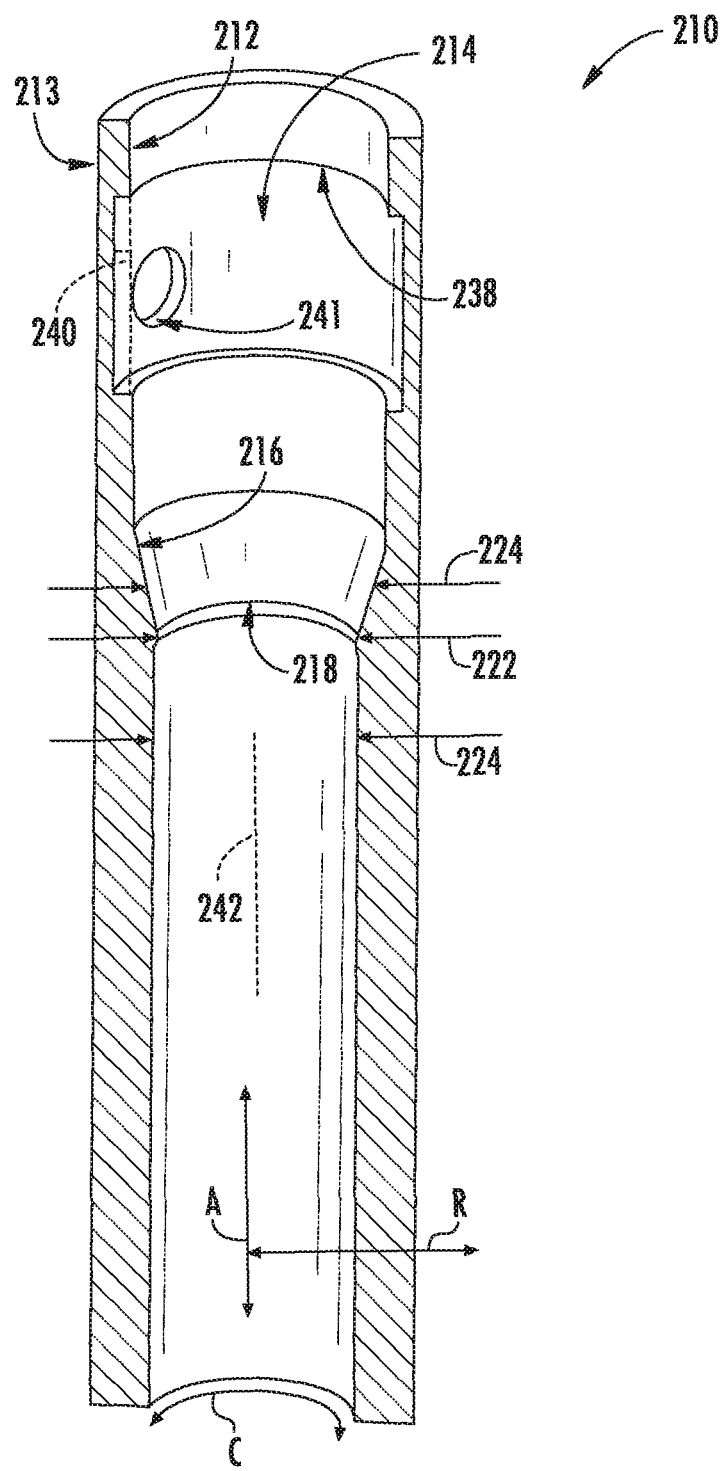
FIG. 5 is a section view of a housing of the example sealing connection assembly of FIG. 4.
Figure 6:
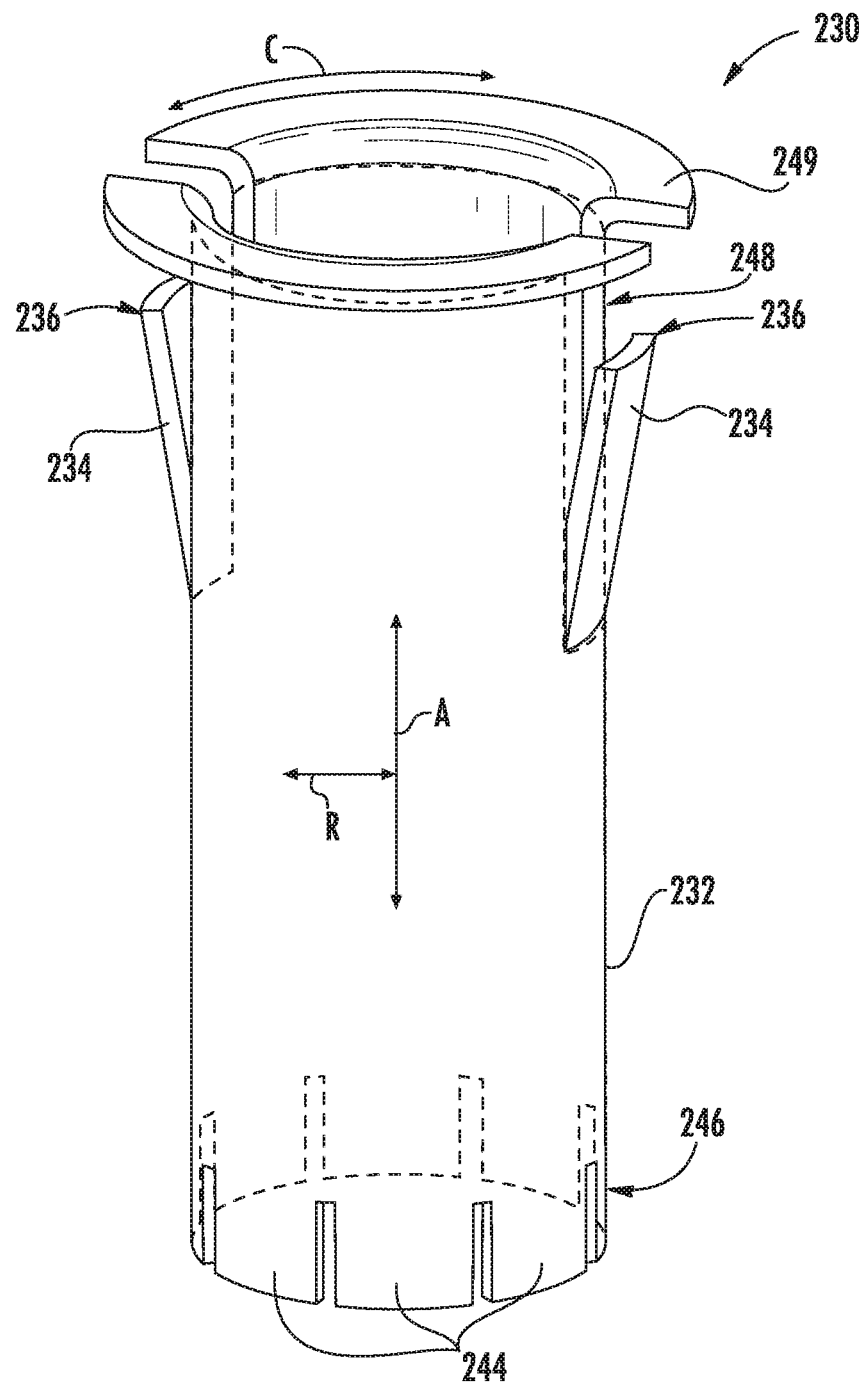
FIG. 6 is a perspective view of a clamp of the example sealing connection assembly of FIG. 4.
Figure 7:
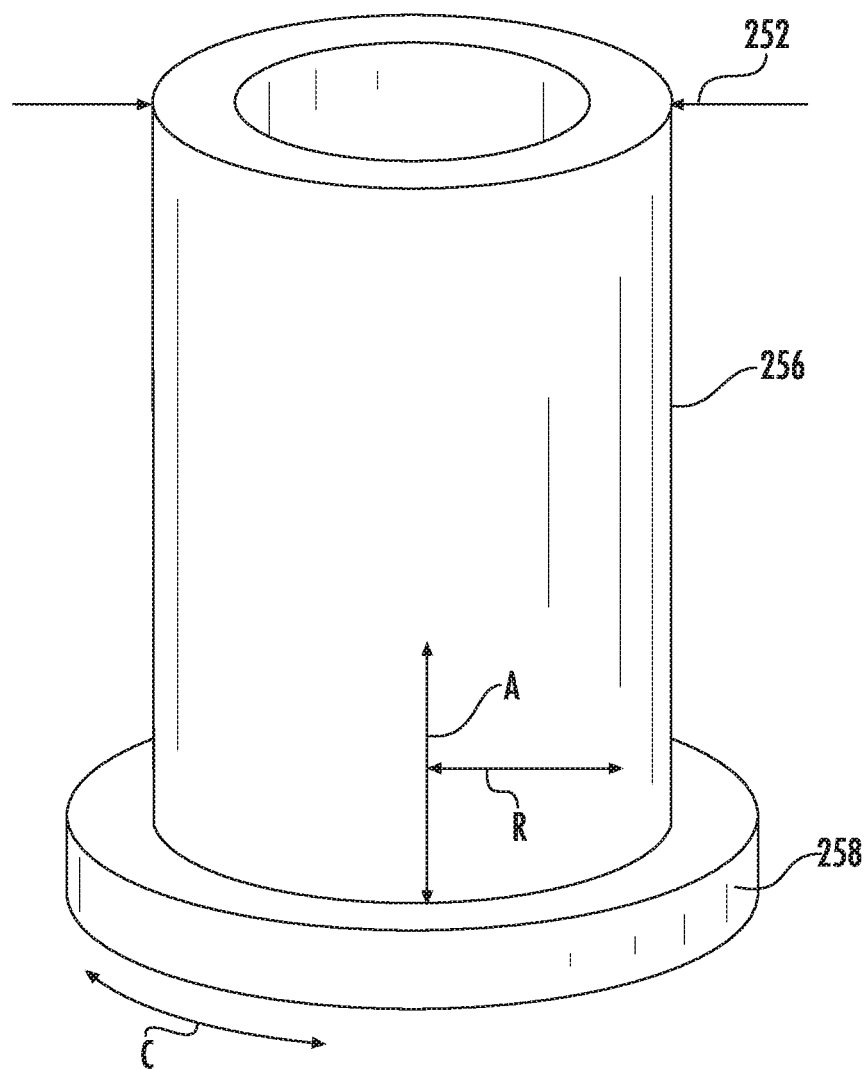
FIG. 7 is a perspective view of an insert of the example sealing connection assembly of FIG. 4.

FIG. 4 is a partial, section view of a sealing connection assembly 200 according to an example embodiment of the present subject matter. As may be seen in FIG. 4, sealing connection assembly 200 includes a housing 210, a clamp 230 and an insert 250. FIG. 5 is a section view of housing 210. FIG. 6 is a perspective view of clamp 230, and FIG. 7 is a perspective view of insert 250. As discussed in greater detail below, sealing connection assembly 200 assists with reliably sealing the connection between hermetic shell 105 and discharge conduit 140. However, it will be understood that sealing connection assembly 200 may also be used to reliably seal the connection between discharge valve 118 and discharge conduit 140. In addition, while described in greater detail below in the context of linear compressor 100, it will be understood that sealing connection assembly 200 may be used in or with any suitable compressor, such as an air compressor or a rotary crank compressor. Thus, sealing connection assembly 200 is not limited to any particular type or style of compressor.

Discharge conduit 140 may be plastic tubing suitable for use with a refrigerant. For example, discharge conduit 140 may be polytetrafluoroethylene plastic tubing, polyethylene plastic tubing, or nylon plastic tubing. In addition, hermetic shell 105 may be a metal hermetic shell. Hermetic shell 105 may be constructed of or with any suitable type of metal, such as steel. Sealing connection assembly 200 may assist with reliably sealing the connection between hermetic shell 105 and discharge conduit 140 despite the different materials used to construct hermetic shell 105 and discharge conduit 140, e.g., despite discharge conduit 140 being a plastic discharge conduit and hermetic shell 105 being a metal hermetic shell.

Sealing connection assembly 200 includes housing 210, and housing 210 may be mounted to hermetic shell 105. As noted above, housing 210 may be mounted to discharge conduit 140 in alternative exemplary embodiments. Housing 210 may be mounted to hermetic shell 105 using any suitable method or mechanism. For example, housing 210 may be threaded, welded, press-fit, etc. to hermetic shell 105. In particular, housing 210 may be threaded, welded, press-fit, etc. to wall 106 of hermetic shell 105.

With reference to FIGS. 4 and 5, housing 210 may have a generally cylindrical outer surface 213, and an inner surface 212 of housing 210 may define a passage 214. Passage 214 of housing 210 extends, e.g., along an axial direction A, through housing 210. Various components of sealing connection assembly 200 may be positioned or disposed within passage 214 of housing 210. Thus, passage 214 of housing 210 may be sized for receiving other components of sealing connection assembly 200.

Inner surface 212 of housing 210 may also be shaped to engage with other components of sealing connection assembly 200. For example, inner surface 212 of housing 210 may include a tapered portion 216 that contracts to a sealing edge 218. Sealing edge 218 may have a diameter 222, and the diameter 222 of sealing edge 218 may be smaller than diameters 224 of inner surface 212 that are adjacent sealing edge 218 on both sides of sealing edge 218, e.g., along the axial direction A. Thus, e.g., inner surface 212 of housing 210 may contract on both sides of sealing edge 218 along the axial direction A towards sealing edge 218. In particular, the diameter 222 of sealing edge 218 may have the smallest diameter of inner surface 212 of housing 210, e.g., such that sealing edge 218 corresponds to the narrowest portion of inner surface 212.

As shown in FIG. 4, an end portion 142 of discharge conduit 140 is positioned within passage 214 of housing 210. Thus, discharge conduit 140 is received within passage 214 of housing 210. With discharge conduit 140 positioned within housing 210, an outer surface 144 of discharge conduit 140 may be positioned on and contact inner surface 212 of housing 210 at sealing edge 218. Contact between housing 210 and discharge conduit 140 at sealing edge 218 may form a seal 220 that blocks or limits refrigerant flow out of hermetic shell 105 through a gap between housing 210 and discharge conduit 140, e.g., along the radial direction R. Thus, sealing edge 218 and outer surface 144 of discharge conduit 140 may form seal 220 where outer surface 144 of discharge conduit 140 is positioned on and contacts sealing edge 218. To assist with forming seal 220, an outer diameter 255 of discharge conduit 140 may be about equal to or slightly greater than the diameter 222 of sealing edge 218.

With reference to FIGS. 4 and 6, sealing connection assembly 200 also includes clamp 230. A tubular body 232 of clamp 230 is positioned within housing 210 and is received on discharge conduit 140. As discussed in greater detail below, clamp 230 assist with mounting or coupling discharge conduit 140 to housing 210. Thus, clamp 230 may limit or prevent blow out of discharge conduit 140 from housing 210 during operation of linear compressor 100.

Clamp 230 includes a plurality of clips 234. While shown with two clips in the example embodiment shown in FIGS. 4 and 6, clamp 230 may include any suitable number of clips 234 in alternative embodiments. Clips 234 extend, e.g., outwardly along a radial direction R, from tubular body 232. When clamp 230 is positioned within housing 210, e.g., as shown in FIG. 4, clips 234 extend from tubular body 232 into passage 214 of housing 210. For example, a distal end 236 of each clip 234 may be positioned at or against an undercut 238 on inner surface 212 of housing 210. Tapered portion 216 of inner surface 212 may be positioned between undercut 238 and sealing edge 218, e.g., along the axial direction A, within housing 210.

Undercut 238 may correspond to a portion of inner surface 212 that is oriented to engage clips 234 to hold clamp 230 within housing 210. For example, a tangent line 240 of undercut 238 may be about parallel to a central axis 242 of passage 214 of housing 210. As used herein, the term "about" means within ten degrees of the stated angle when used in the context of angles. Central axis 242 may be positioned concentrically within passage 214 of housing 210, e.g., such that central axis 242 is positioned equidistant from inner surface 212 in the radial direction R along an axial length of housing 210.

Clips 234 may be cantilevered from tubular body 232. Thus, clips 234 may be elastically deformable during insertion of clamp 230 into housing 210. As an example, an installer may push clamp 230 into passage 214 of housing 210 along the axial direction A, and clips 234 may flex inwardly along the radial direction R as clips 234 slide against housing 210. When clamp 230 is suitable positioned within passage 214 of housing 210, e.g., such that clips 234 at aligned with undercut 238, clips 234 may flex outwardly along the radial direction R towards undercut 238, e.g., such that clips 234 snap-fit clamp 230 to housing 210. Thus, distal ends 236 of clips 234 may be spaced from tubular body 232, e.g., along the radial direction R, when clamp 230 is received within housing 210.

With clamp 230 received within housing 210, distal ends 236 of clips 234 may contact or impact housing 210 at undercut 238, e.g., during relative motion between discharge conduit 140 and housing 210 along the axial direction A. Thus, once clamp 230 is inserted into passage 214 of housing 210, clips 234 may limit or block retraction of clamp 230 (and therefor discharge conduit 140) from housing 210. However, holes 241 may be formed in housing 210, and a tool may be inserted into each hole 241 to compress clips 234 and permit retraction of clamp 230 (and therefor discharge conduit 140) from housing 210. Thus, clips 234 may permit selective removal of clamp 230 from housing 210.

Clamp 230 includes a plurality of tabs 244 positioned on tubular body 232 of clamp 230. In particular, clamp 230, e.g., tubular body 232, extends between a first end portion 246 and a second end portion 248, e.g., along the axial direction A. Tabs 244 may be positioned at first end portion 246 of clamp 230, and a flange 249 may be positioned at second end portion 248 of clamp 230. Thus, tabs 244 and flange 249 may be positioned opposite each other, e.g., along the axial direction A, on tubular body 232.

Tabs 244 may extend linearly along the axial direction A from tubular body 232 when clamp 230 is not inserted into housing 210, as shown in FIG. 6. Tabs 244 may also be distributed or spaced apart from one another, e.g., along a circumferential direction C, at first end portion 246 of clamp 230. Tabs 244 may be formed by cutting or notching tubular body 232 in certain embodiments.

Tabs 244 may be cantilevered from tubular body 232, and tabs 244 may be elastically deformable during insertion of clamp 230 into housing 210. As an example, an installer may push clamp 230 into passage 214 of housing 210 along the axial direction A, and tabs 244 may impact or slide on tapered portion 216 of inner surface 212. As tabs 244 slide on tapered portion 216, tabs 244 deflect or bend inwardly along the radial direction R until tabs 244 engage and are compressed against an outer surface 144 of discharge conduit 140. Thus, tapered portion 216 of inner surface 212 may be positioned and/or angled to engage tabs 244 when clamp 230 is inserted into passage 214 of housing 210.

Tabs 244 may also be positioned on and contact discharge conduit 140 when clamp 230 is received within housing 210, as shown in FIG. 4. In particular, tabs 244 may be compressed against outer surface 144 of discharge conduit 140 when clamp 230 is received within housing 210. Thus, tabs 244 may be compressed between outer surface 144 of discharge conduit 140 and tapered portion 216 of inner surface 212 of housing 210. Tabs 244 assist clamp 230 with connecting discharge conduit 140 to housing 210. For example, tabs 244 may limit or prevent relative motion between discharge conduit 140 and housing 210, e.g., along the axial direction A, when tabs 244 engage discharge conduit 140. In particular, tabs 244 may connect clamp 230 to discharge conduit 140, and clips 234 may connect clamp 230 to housing 210. In such a manner, clamp 230 may couple discharge conduit 140 to housing 210, e.g., such that relative motion along the axial direction A between discharge conduit 140 to housing 210, is limited or prevented by clamp 230.

With reference to FIGS. 4 and 7, sealing connection assembly 200 also includes insert 250. Insert 250 is received within discharge conduit 140. For example, a tubular body 256 of insert 250 may be disposed within a passage 148 of discharge conduit 140, and a flange 258 of insert 250 may be positioned on an end of discharge conduit 140, e.g., outside of passage 148 discharge conduit 140. Flange 258 may be wider than tubular body 256 of insert 250, e.g., along the radial direction R, to avoid over-insertion of insert 250 into discharge conduit 140. Insert 250 may be constructed of a suitable metal, such as steel, brass, etc.

Insert 250 may be positioned opposite tabs 244, e.g., along the radial direction R, within discharge conduit 140, as shown in FIG. 4. In addition, an outer diameter 252 of insert 250 may be about equal to an inner diameter 254 of discharge conduit 140. Insert 250 may limit or prevent deformation of discharge conduit 140 due to compression of tabs 244 against discharge conduit 140. Thus, the sizing and/or position of insert 250 within discharge conduit 140 may prevent discharge conduit 140 from crushing and assist clamp 230 with engaging discharge conduit 140.

As shown in FIG. 4, clamp 230 and insert 250 mount end portion 142 of discharge conduit 140 within housing 210. With sealing connection assembly 200 so arranged, refrigerant is flowable through passage 148 of discharge conduit 140, e.g., from discharge valve 118 out of hermetic shell 105, and the seal 220 between discharge conduit 140 and housing 210 at sealing edge 218 limits refrigerant leakage. In such a manner, sealing connection assembly 200 may provide a reliable seal between a metal hermetic shell and a plastic discharge conduit without requiring a labor intensive brazing process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A compressor, comprising:
a hermetic shell;
a discharge valve positioned within the hermetic shell;
a discharge conduit extending between the discharge valve and the hermetic shell within the hermetic shell; and
a sealing connection assembly comprising a housing mounted to one of the discharge valve and the hermetic shell, an inner surface of the housing defining a passage that extends through the housing, the inner surface of the housing having a tapered portion that contracts to a sealing edge,
wherein an end portion of the discharge conduit is positioned within the passage of the housing such that an outer surface of the discharge conduit is positioned on and contacts the inner surface of the housing at the sealing edge, the sealing edge and the outer surface of the discharge conduit forming a seal where the outer surface of the discharge conduit is positioned on and contacts the sealing edge;

wherein a diameter of the sealing edge is smaller than a diameter of the inner surface of the housing adjacent the sealing edge on both sides of the sealing edge.

2. The compressor of claim 1, wherein the diameter of the sealing edge is the smallest diameter of the inner surface of the housing.

3. The compressor of claim 1, wherein the sealing connection assembly further comprises a clamp, a tubular body of the clamp positioned within the housing and received on the discharge conduit, a clip extending from the tubular body into the passage of the housing.

4. The compressor of claim 3, wherein a distal end of the clip is positioned at an undercut on the inner surface of the housing, a tangent line of the undercut being about parallel to a central axis of the passage of the housing.

5. The compressor of claim 4, wherein the tapered portion of the inner surface is positioned between the undercut and the sealing edge within the housing.

6. The compressor of claim 3, wherein the clip is cantilevered from the tubular body such that the clip is elastically deformable during insertion of the clamp into the housing.

7. The compressor of claim 3, wherein a plurality of tabs is positioned on the tubular body at an end of the tubular body, the plurality of tabs positioned on and contacting the discharge conduit at the tapered portion of the inner surface of the housing.

8. The compressor of claim 7, wherein the plurality of tabs compressed against the outer surface of the discharge conduit and the tapered portion of the inner surface of the housing.

9. The compressor of claim 8, wherein the sealing connection assembly further comprises an insert received within the discharge conduit, the insert positioned opposite the plurality of tabs within the discharge conduit.

10. The compressor of claim 9, wherein an outer diameter of the insert is about equal to an inner diameter of the discharge conduit.

11. The compressor of claim 1, wherein the housing is threaded to the one of the wall of the discharge valve and the wall of the hermetic shell.

12. The compressor of claim 1, wherein the discharge conduit comprises plastic tubing.

13. The compressor of claim 1, wherein the hermetic shell is a metal hermetic shell.

14. A compressor, comprising:
a hermetic shell;
a discharge valve positioned within the hermetic shell;
a discharge conduit extending between the discharge valve and the hermetic shell within the hermetic shell; and
a sealing connection assembly comprising
a housing mounted to one of the discharge valve and the hermetic shell, an inner surface of the housing defining a passage that extends through the housing, the inner surface of the housing having a tapered portion that contracts to a sealing edge, an end portion of the discharge conduit is positioned within the passage of the housing such that an outer surface of the discharge conduit is positioned on and contacts the inner surface of the housing at the sealing edge, the sealing edge and the outer surface of the discharge conduit forming a seal where the outer surface of the discharge conduit is positioned on and contacts the sealing edge, and
a clamp having a tubular body that is positioned within the housing and received on the discharge conduit, a clip of the clamp extending from the tubular body into the passage of the housing, a plurality of tabs positioned on the tubular body at an end of the tubular body, the plurality of tabs positioned on and contacting the discharge conduit at the tapered portion of the inner surface of the housing.

15. The compressor of claim 14, wherein a diameter of the sealing edge is smaller than a diameter of the inner surface of the housing adjacent the sealing edge on both sides of the sealing edge.

16. The compressor of claim 14, wherein the sealing connection assembly further comprises an insert received within the discharge conduit, the insert positioned opposite the plurality of tabs within the discharge conduit.

17. The compressor of claim 14, wherein a distal end of the clip is positioned at an undercut on the inner surface of the housing, a tangent line of the undercut being about parallel to a central axis of the passage of the housing.

18. The compressor of claim 17, wherein the tapered portion of the inner surface is positioned between the undercut and the sealing edge within the housing.

19. The compressor of claim 14, wherein the discharge conduit comprises plastic tubing.

20. A compressor, comprising:
a hermetic shell;
a discharge valve positioned within the hermetic shell;
a discharge conduit extending between the discharge valve and the hermetic shell within the hermetic shell;
a sealing connection assembly comprising a housing mounted to one of the discharge valve and the hermetic shell, an inner surface of the housing defining a passage that extends through the housing, the inner surface of the housing having a tapered portion that contracts to a sealing edge, the sealing connection assembly further comprising a clamp,
wherein an end portion of the discharge conduit is positioned within the passage of the housing such that an outer surface of the discharge conduit is positioned on and contacts the inner surface of the housing at the sealing edge, the sealing edge and the outer surface of the discharge conduit forming a seal where the outer surface of the discharge conduit is positioned on and contacts the sealing edge, a tubular body of the clamp positioned within the housing and received on the discharge conduit, a clip extending from the tubular body into the passage of the housing.

* * * * *